US012632346B2

(12) United States Patent
Upadhyay et al.

(10) Patent No.: US 12,632,346 B2
(45) Date of Patent: May 19, 2026

(54) MANAGEMENT OF ASSET GROUPS IN A HIGH-AVAILABILITY CONFIGURATION

(71) Applicant: Dell Products L.P., Round Rock, TX (US)

(72) Inventors: Navneet Upadhyay, Greater Noida (IN); Rejith Mohan M, Bengaluru (IN); Ban Wang, Burlington (CA); Amith Ramachandran, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 90 days.

(21) Appl. No.: 18/496,102

(22) Filed: Oct. 27, 2023

(65) Prior Publication Data

US 2025/0138956 A1     May 1, 2025

(51) Int. Cl.
G06F 11/1446         (2026.01)

(52) U.S. Cl.
CPC ...... G06F 11/1464 (2013.01); G06F 11/1451 (2013.01)

(58) Field of Classification Search
CPC .......................... G06F 11/1464; G06F 11/1451
See application file for complete search history.

(56) References Cited

U.S. PATENT DOCUMENTS

| | | | |
|---|---|---|---|
| 7,031,974 B1 | 4/2006 | Subramaniam | |
| 7,865,471 B1 | 1/2011 | Stagg | |
| 11,354,195 B2 | 6/2022 | Chopra | |
| 2003/0196052 A1* | 10/2003 | Bolik | G06F 11/1448 |
| | | | 714/E11.121 |
| 2014/0108352 A1 | 4/2014 | Ahrens et al. | |
| 2016/0342483 A1 | 11/2016 | Klingenberg et al. | |
| 2018/0150539 A1 | 5/2018 | Andrei et al. | |
| 2019/0377642 A1* | 12/2019 | Khan | G06F 11/2028 |
| 2021/0240657 A1* | 8/2021 | Kumar | G06F 11/1451 |
| 2021/0318824 A1 | 10/2021 | Cain | |
| 2021/0397520 A1 | 12/2021 | Morton | |
| 2023/0297547 A1 | 9/2023 | Raju | |
| 2023/0315552 A1 | 10/2023 | Cacheaux | |
| 2023/0376386 A1* | 11/2023 | Kochar | G06F 16/27 |
| 2024/0111715 A1 | 4/2024 | Yadav | |
| 2024/0248812 A1 | 7/2024 | Minarik | |

OTHER PUBLICATIONS

"Oracle® Data Guard, Concepts and Administration." (Feb. 2021), Oracle, 19C E96244-04 (438 pages).

* cited by examiner

*Primary Examiner* — Tony Wu

(74) *Attorney, Agent, or Firm* — Chamberlain, Hrdlicka, White, Williams & Aughtry; Aly Z. Dossa

(57) ABSTRACT

In general, in one aspect, the technology relates to a method for backing up assets, the method comprising obtaining a group identifier (ID) associated with an asset, associating the asset with an asset group using the group ID, wherein all assets in the asset group are associated with the group ID, and protecting the asset in the asset group using a backup strategy associated with the asset group.

14 Claims, 10 Drawing Sheets

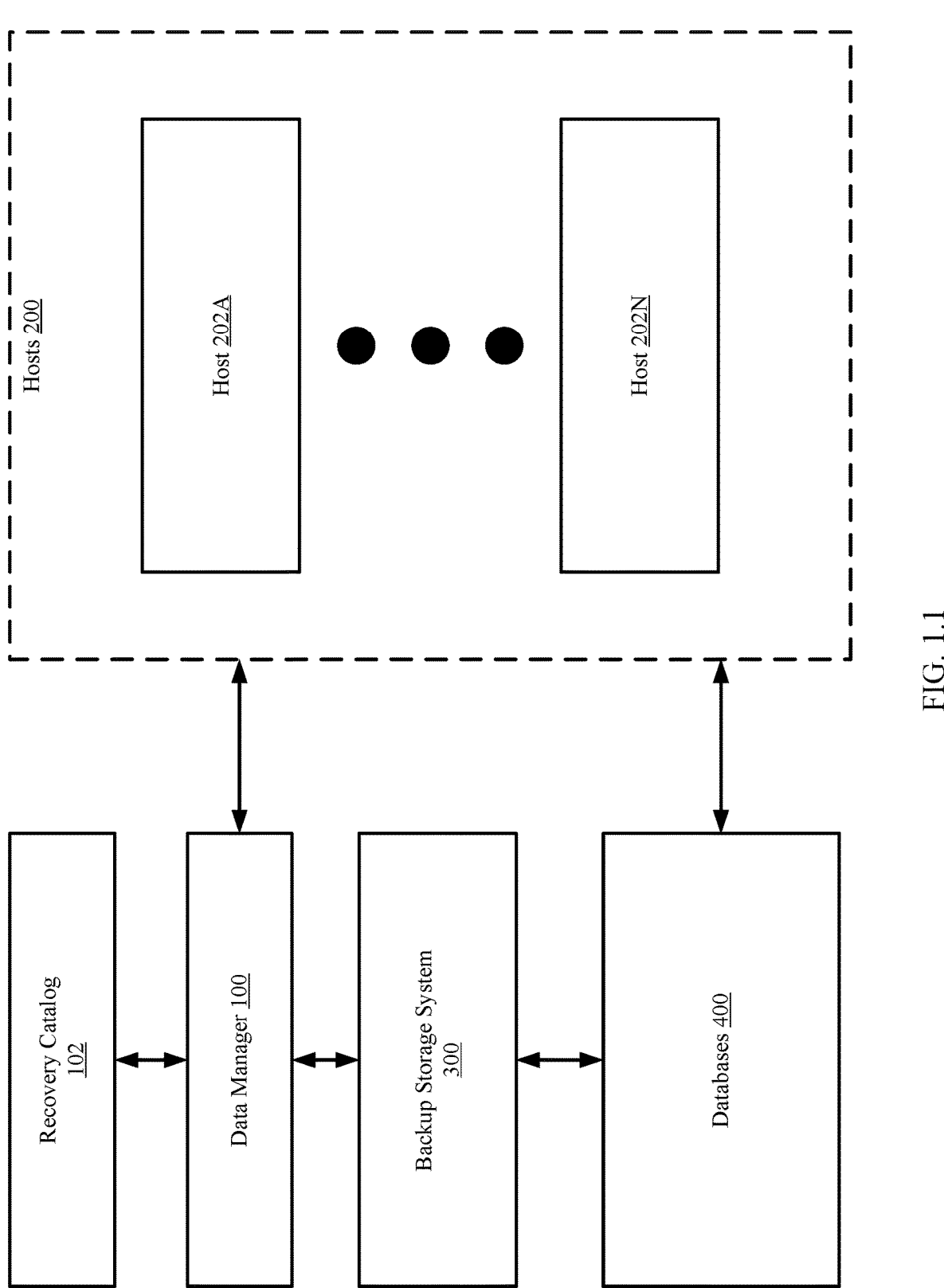
FIG. 1.1

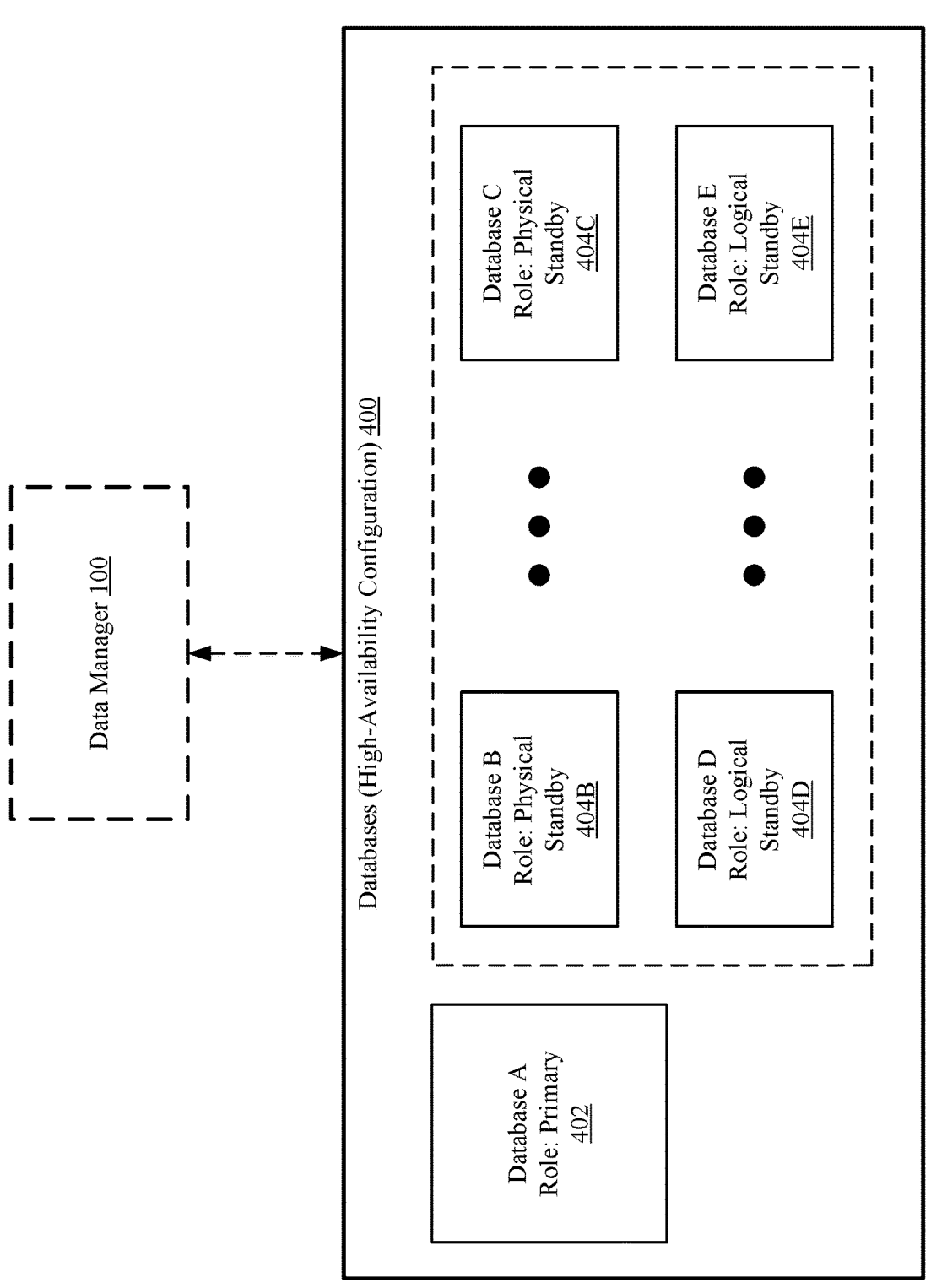
FIG. 1.2

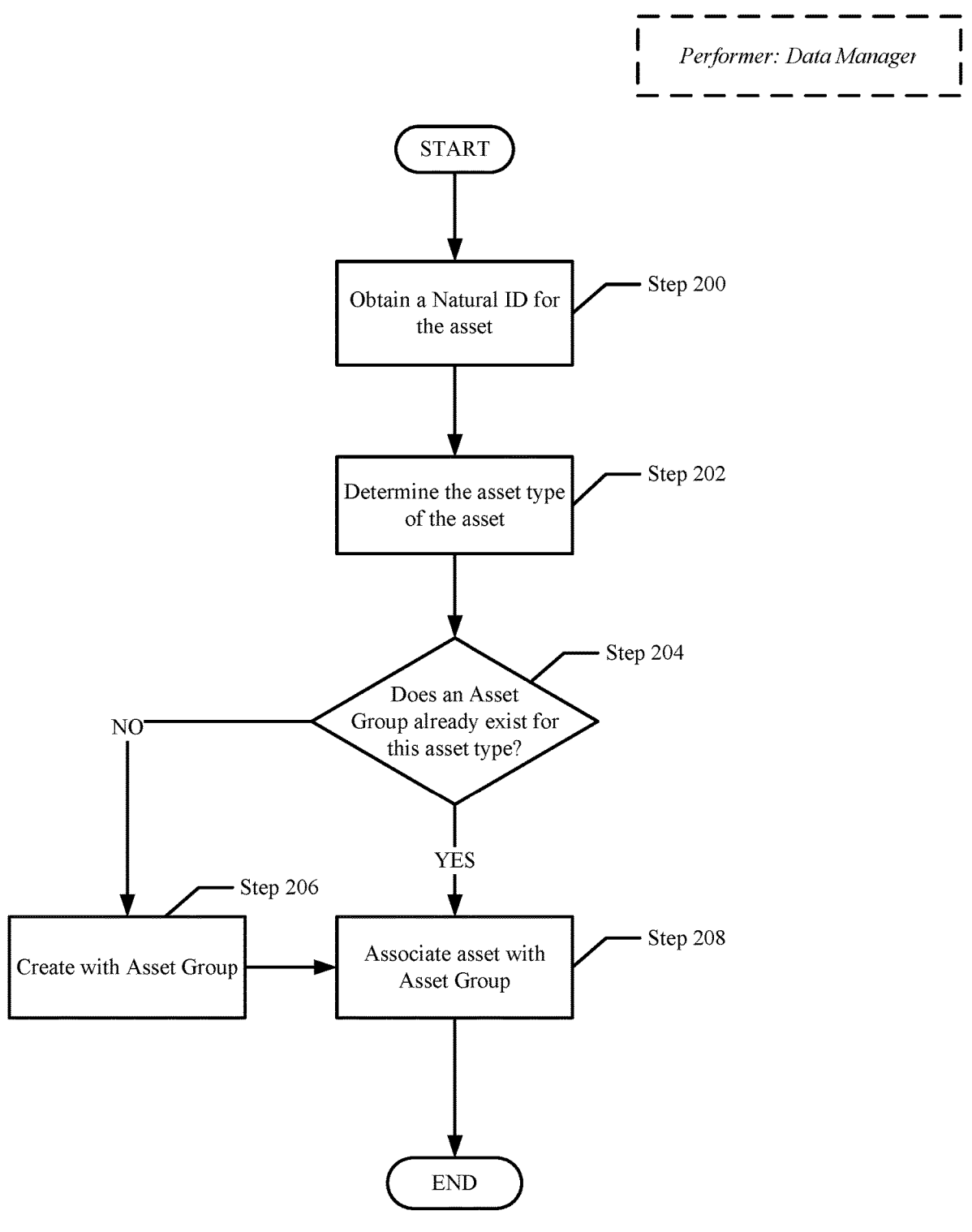
FIG. 2.1

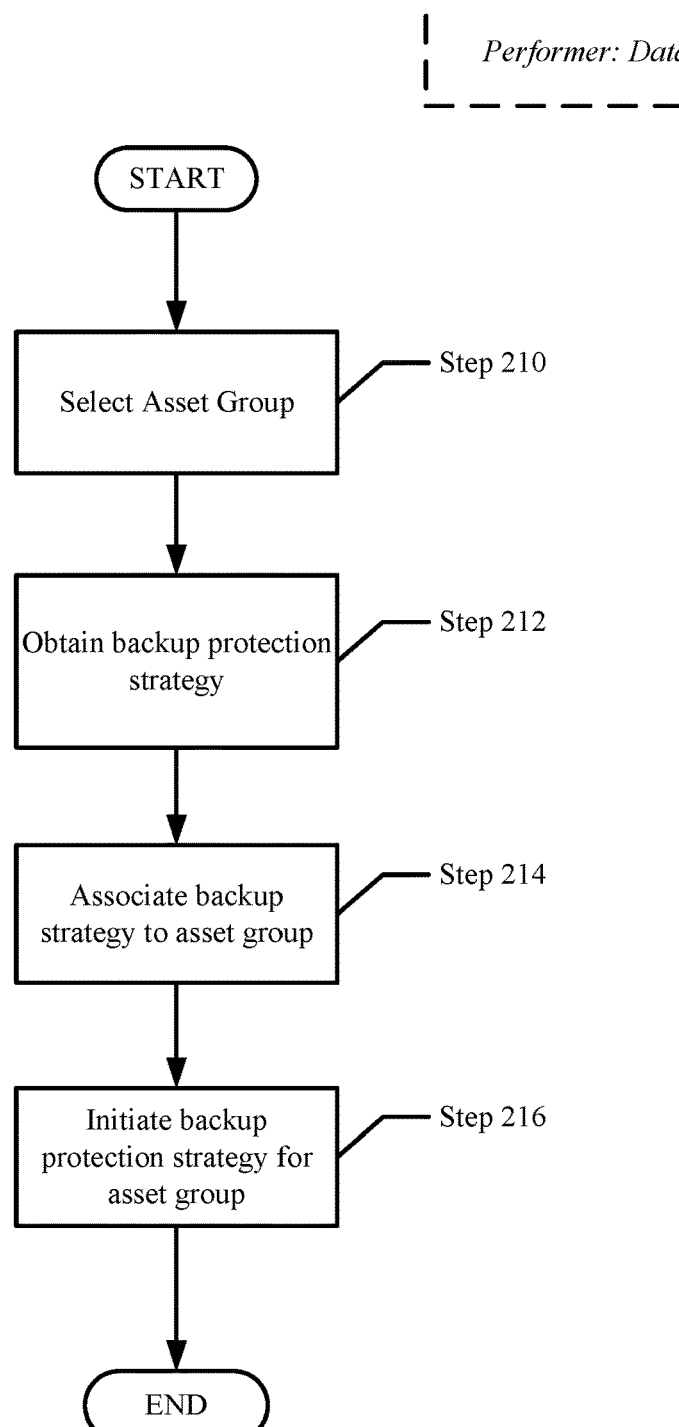
FIG. 2.2

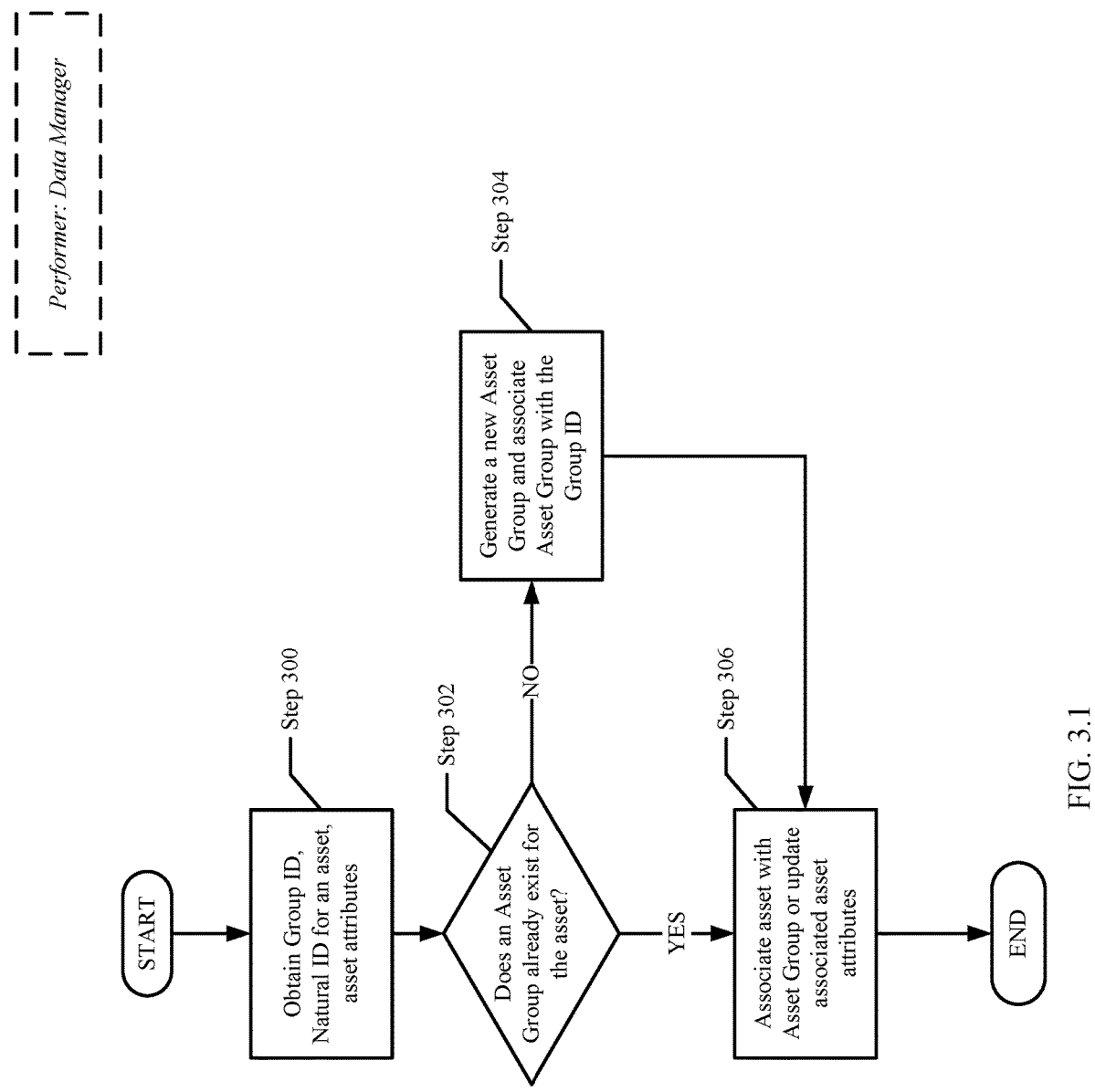
FIG. 3.1

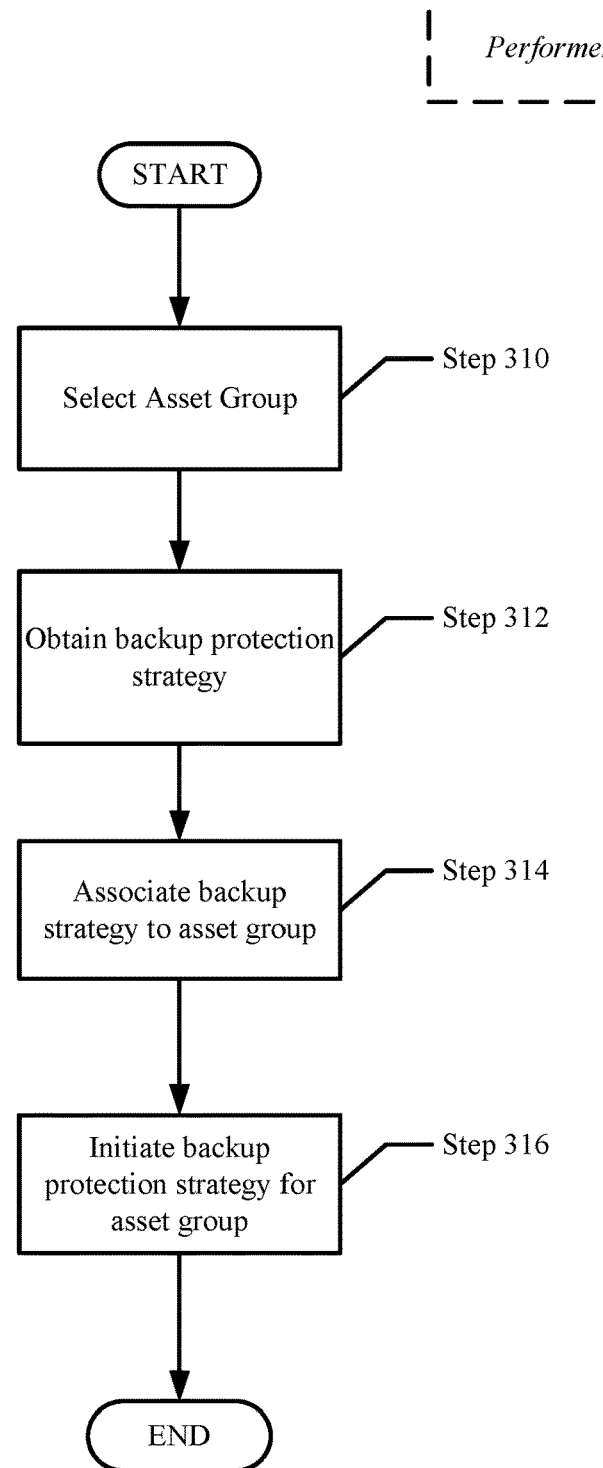
FIG. 3.2

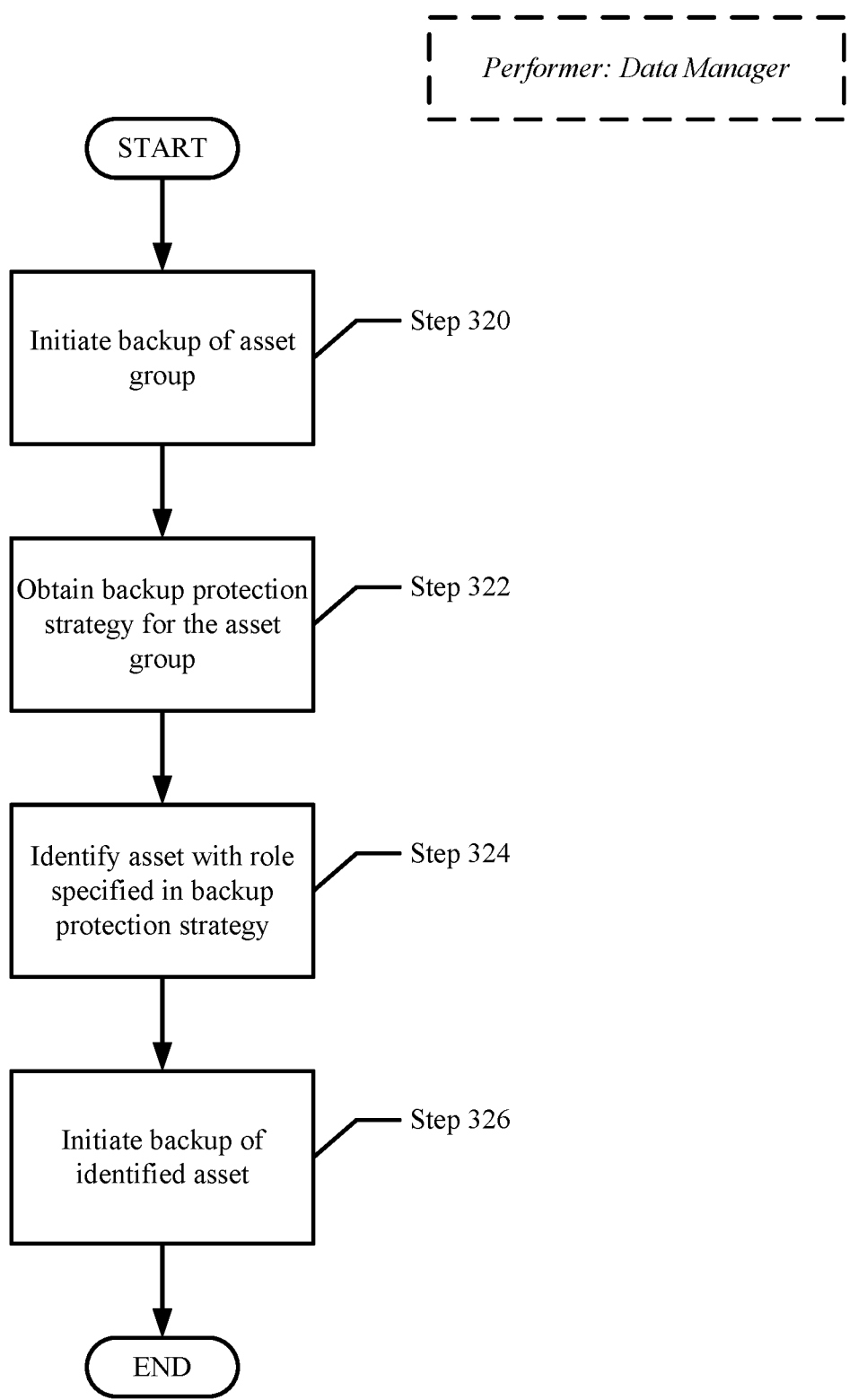
FIG. 3.3

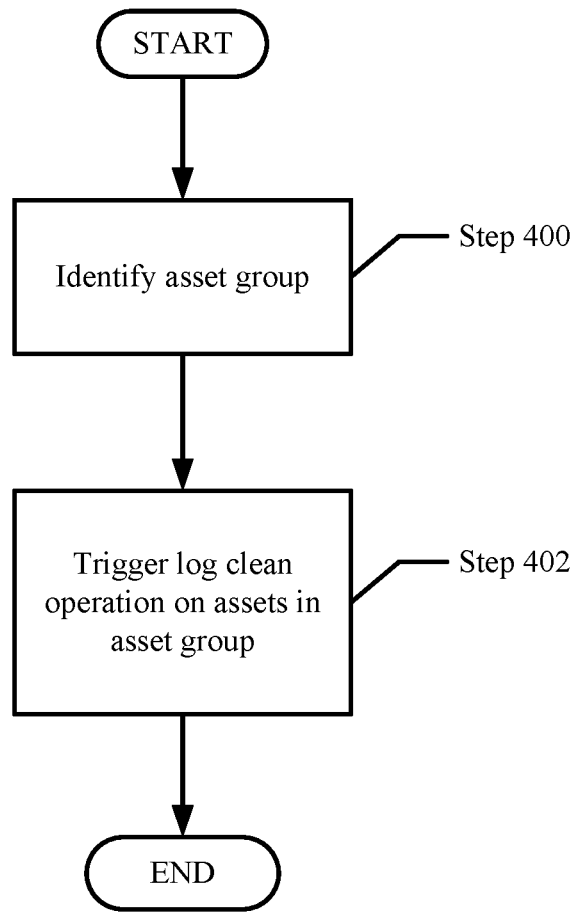
Performer: Data Manager
START
Identify asset group — Step 400
Trigger log clean operation on assets in asset group — Step 402
END
FIG. 4.1

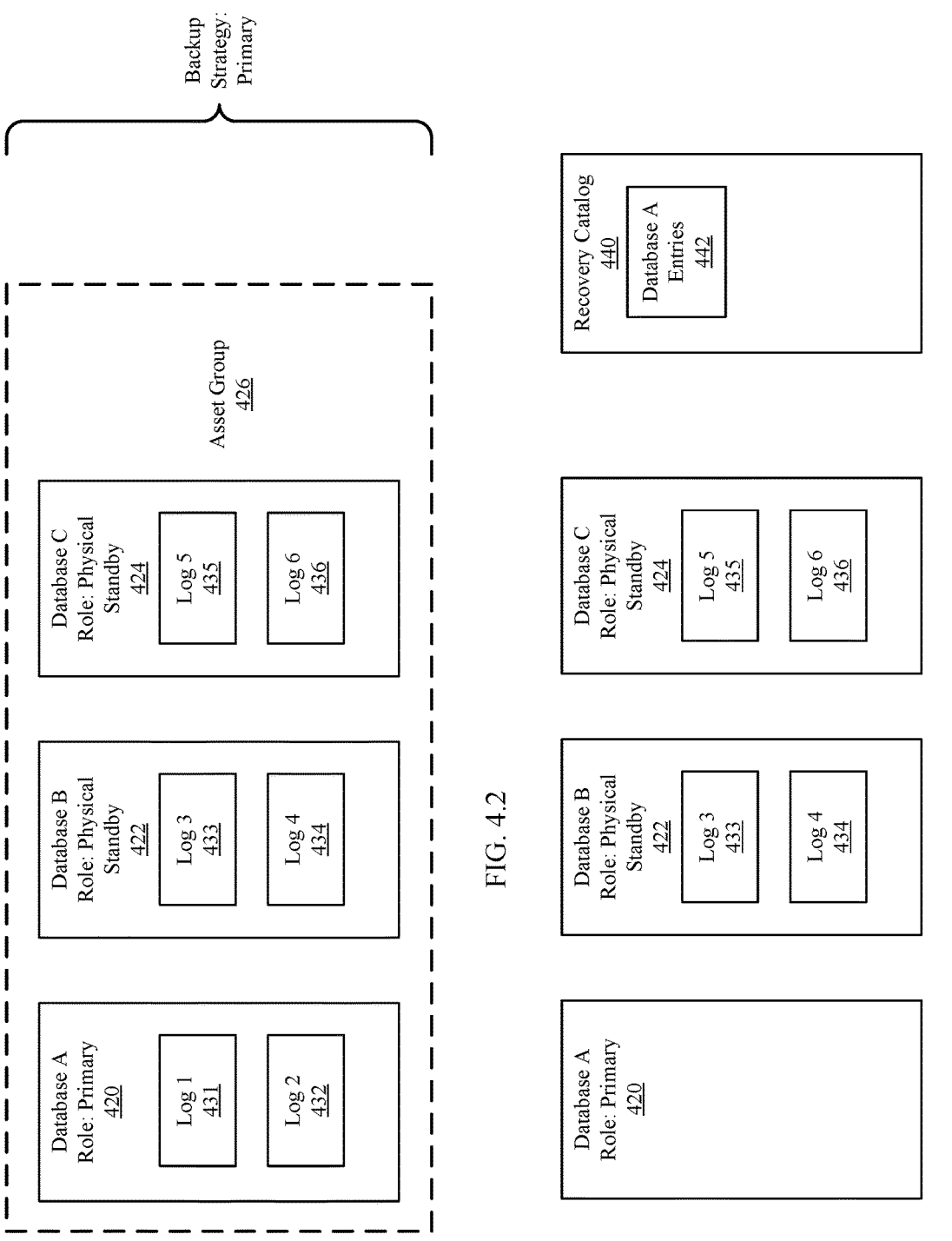
FIG. 4.2
FIG. 4.3

MANAGEMENT OF ASSET GROUPS IN A HIGH-AVAILABILITY CONFIGURATION

BACKGROUND

Computing devices may include any number of internal components such as processors, memory, and persistent storage. Computing resources associated with (e.g., used by) each of these internal components may be used to generate, store, and backup data. Data is categorized in order to have the best overall performance of the computing devices when backing up, organizing, and protecting data.

BRIEF DESCRIPTION OF DRAWINGS

Certain embodiments of the technology will be described with reference to the accompanying drawings. However, the accompanying drawings illustrate only certain aspects or implementations of the technology by way of example and are not meant to limit the scope of the claims.

FIG. 1.1 shows a diagram of a system in accordance with one or more embodiments of the technology.

FIG. 1.2 shows a diagram of a configuration of databases in accordance with one or more embodiments of the technology.

FIGS. 2.1-2.2 show flowcharts of a method for backing up an asset in accordance with one or more embodiments of the technology.

FIGS. 3.1-3.3 show flowcharts of a method for backing up an asset in accordance with one or more embodiments of the technology.

FIG. 4.1 shows a flowchart of a method for managing database logs in accordance with one or more embodiments of the technology.

FIGS. 4.2-4.3 show a non-limiting example of a use case of the method shown in FIG. 4.1.

DETAILED DESCRIPTION

Figure 5:
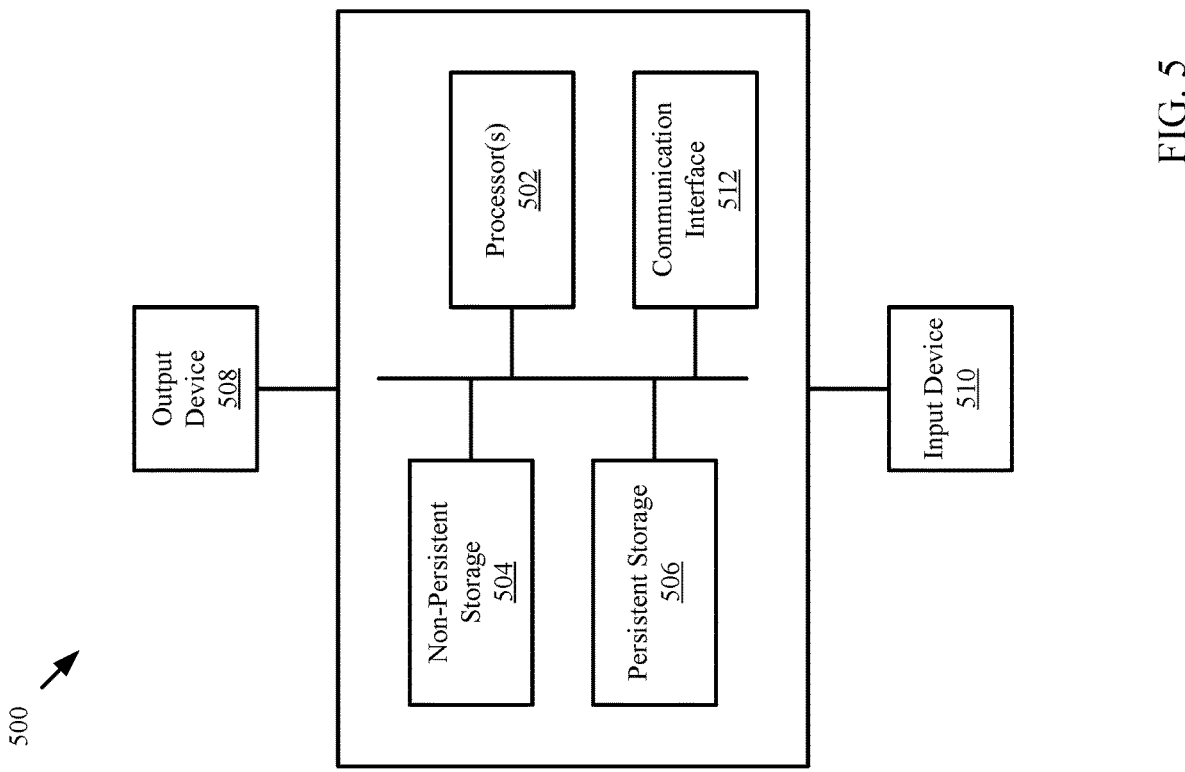
FIG. 5 shows a computing system in accordance with one or more embodiments of the technology.

Specific embodiments will now be described with reference to the accompanying figures.

In general, embodiments of the technology relate to backing up assets on an asset group basis. In the context of this technology, an asset is data or a database that is associated with a file, a folder and/or any other data hierarchy (or structure) (e.g., a volume). More specifically, various embodiments relate to determining how and when to back up assets in a manner that efficiently utilizes system resources.

Referring to FIGS. 2.1-2.2, in one embodiment of the technology, an asset is associated with an asset group based on the asset type. For each asset group in the system, there is an associated backup protection strategy. The introduction of the asset group enables backup protection strategies (or policies) to be applied at the asset group level as opposed to at the individual asset level.

Referring now to FIGS. 3.1-3.3, in one embodiment of the technology, assets in a high-availability configuration (see e.g., FIG. 1.2) may be grouped into an asset group and associated with an asset group identifier (also referred to as a group identifier). This asset group identifier may be propagated to a data manager (see e.g., FIG. 1.1, 100). The data manager may then generate and implement backup protection strategies (or policies) based on the asset group (which is identified using the asset group identifiers).

Referring now to FIGS. 4.1-4.3, in one embodiment of the technology, in high-availability configurations only one database of an asset group may be backed up (see e.g., FIGS. 3.1-3.3). The result of the backup process is that the contents of one database are backed up and, as part of the backup process, the log files (e.g., redo logs) relating to the backed up database will be removed. However, due to the implementation of the databases, the other databases in the asset group that are not backed up will continue to maintain their own copies of these logs. In one or more embodiments of the technology, the data manager is able to determine the members of the asset group and if a backup of the asset group has been successfully completed for one member of the asset group. In response to this determination, the data manager is able to delete logs that are maintained on the non-backed up assets, thereby allowing this space to be reclaimed.

The above three approaches may be used together or separately and may be implemented on the systems shown in FIGS. 1.1-1.2 and 5.

The following describes one or more embodiments of the technology.

FIG. 1.1 shows a diagram of a system in accordance with one or more embodiments described herein. The system includes a data manager (102), one or more hosts (e.g., 200), one or more backup storage systems (e.g., 300), one or more databases (400), and a recovery catalog (102). Each of these components is described below.

In one or more embodiments, the components in FIG. 1.1 may operatively connect to one another through a network (e.g., a local area network (LAN), a wide area network (WAN) such as the Internet, a mobile network, etc.). The network may be implemented using any combination of wired and/or wireless connections. Further, the network may encompass various interconnected, network-enabled sub-components (or systems) (e.g., switches, routers, gateways, etc.) that may facilitate communications between the above-mentioned system components. Moreover, the components may communicate with one another using any combination of wired and/or wireless communication protocols.

The data manager (100) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2.1-4.1. The data manager (100) may be implemented using other types of computing devices without departing from embodiments disclosed herein. For additional details regarding computing devices, refer to FIG. 5.

The data manager (100) may be implemented using logical devices without departing from embodiments disclosed herein. For example, the data manager (100) may include virtual machines that utilize computing resources of any number of physical computing devices to provide the functionality of the data manager (100). The data manager (100) may be implemented using other types of logical devices without departing from the embodiments disclosed herein.

In one or more embodiments, the data manager (100) may include the functionality to, or may be otherwise programmed to, perform backup orchestration services databases (400).

In one or more embodiments, the data manager (100) includes data manager records (not shown) which include records (or entries) about the assets (e.g., the databases (400)) that the data manager (102) is protecting (i.e., performing backup services for). The records for each of the assets may include, but is not limited to, (i) one or more identifiers of the assets (including a Natural identifier (ID) and a group identifier (ID)), (ii) the current role of the asset (e.g., primary, secondary, etc.), and (iii) any other information that is required by the data manager (102) to perform the methods described herein. Further, the data manager records may include, but are not limited to, backup polices (or protection policies), that describe what assets to backup, when to back up such assets, and the type of backup (e.g., incremental or full) to generate. Further, data manager records may be stored in any type of volatile and/or persistent storage using any type of data structure(s).

In one or more embodiments, the data manager (100) includes an agent management module (not shown). The agent module is a component that enables communication between the data manager (100) and agent service (not shown, discussed below) within each host (e.g., 200). The agent management module is operatively connected to the agent service executing in each of the hosts (200).

In one or more embodiments, each of the hosts (e.g., 202A, 202N) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the hosts (e.g., 202A, 202N) described herein and/or all, or a portion, of the methods illustrated in FIGS. 2.1-4.1. The hosts (e.g., 202A, 202N) may be implemented using other types of computing devices without departing from the embodiments disclosed herein. For additional details regarding computing devices, refer to FIG. 5.

The hosts (e.g., 202A, 202N) may be implemented using logical devices without departing from the embodiments disclosed herein. For example, the hosts (e.g., 202A, 202N) may include virtual machines that utilize computing resources of any number of physical computing devices to provide the functionality of the hosts (e.g., 202A, 202N). The hosts (e.g., 202A, 202N) may be implemented using other types of logical devices without departing from the embodiments disclosed herein.

In one or more embodiments, the hosts (e.g., 202A, 202N) may include the functionality to, or otherwise be configured to discover assets, to perform backup jobs orchestrated by the data manager (200) to copy data in the databases (400) to the backup storage system (300), and orchestrate the deletion of log files (see e.g., FIGS. 4.1-4.3). The hosts (e.g., 202A, 202N) may include the functionality to perform all, or a portion, of the methods discussed in FIGS. 2.1-4.1. The hosts (e.g., 202A, 202N) may include other and/or additional functionalities without departing from embodiments disclosed herein.

In one or more embodiments, agent service (not shown) may be a physical or logical component of the host that provides a communication bridge between the data manager (100) and the agent (not shown) and further is used to locally manage the various agents on the host. Agent service is operatively connected to the agent management module (described above), as well as agent service records (not shown) on the host and the agent.

In one or more embodiments, agent service records include records (or entries) about the assets (e.g., the databases (400)) that the agent has discovered. The records for each of the assets may include, but is not limited to, (i) one or more identifiers of the asset (including a Natural identifier (ID) and a group identifier (ID)), (ii) the current role of the asset (e.g., primary, secondary, etc.), and (iii) any other information that is required by the agent service to perform the methods described herein. The records may have different and/or additional information without departing from the technology.

In one or more embodiments, the agent (not shown) may be a physical or logical component of the host that provides a communication bridge between the databases (400), the backup storage system (300), and the agent service. In addition, the agent includes functionality to discovery assets, and to perform backup jobs orchestrated by the data manager (100), where the backup jobs are communicated to the agent via the agent service. In one or more embodiments, the host may include multiple agents, where each agent is configured to interact with a specific type of database (e.g., a database from a specific vendor).

In one or more embodiments, the agent records (not shown) on the host include records (or entries) about the assets (e.g., the databases (400)) that the agent has discovered. The records for each of the assets may include, but is not limited, (i) one or more identifiers of the asset (including a Natural identifier (ID) and a group identifier (ID)), (ii) the current role of the asset (e.g., primary, secondary, etc.), and (iii) any other information that is required by the agent to perform the methods described herein. The records may have different and/or additional information without departing from the technology.

In one or more embodiments, the backup storage system (300) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the backup storage system (300) described herein and/or all, or a portion, of the methods illustrated in FIGS. 2.1-4.1. The backup storage system (300) may be implemented using other types of computing devices without departing from the embodiments disclosed herein. For additional details regarding computing devices, refer to FIG. 5.

The backup storage system (300) may be implemented using logical devices without departing from the embodiments disclosed herein. For example, the backup storage system (300) may include virtual machines that utilize computing resources of any number of physical computing devices to provide the functionality of the backup storage system (300). The backup storage system (300) may be implemented using other types of logical devices without departing from the embodiments disclosed herein.

In one or more embodiments, the backup storage system (300) may include the functionality to, or otherwise be configured to, store and provide data for users (not shown) of the backup storage system (300) for data protection and/or archiving purposes. The backup storage system (300) may store backups assets (e.g., databases (400)). The backups may include full backups and/or incremental backups. Other and/or additional data may be stored in the backup storage system (300) without departing from embodiments disclosed herein. The backup storage system (300) may include other and/or additional functionalities without departing from embodiments disclosed herein.

In one or more embodiments, the system includes one or more databases (400). In one embodiment, each database may represent a local repository for the organization and consolidation of various forms of information. Each database may span logically across one or more physical storage devices and/or media (not shown), which may or may not be of the same type or co-located at a same physical site. Further, information consolidated in each database may be arranged using any storage mechanism (e.g., a file system, a collection of tables or records, etc.). In one embodiment of the invention, each database may be implemented using persistent (i.e., non-volatile) storage. Examples of persistent storage include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM). Additional details about the databases (400) are provided below with respect in FIG. 1.2.

In one embodiment, the system includes one or more recovery catalogs (e.g., 102). The recovery catalog(s) information about the backups that have been created for the databases (400). The recovery catalog(s) also includes the information that is necessary to recover the databases when there is a failure, and a recovery of one or more database is required. In one embodiment, the information includes the same or substantially the same information obtained from the local catalogs (discussed below with respect to FIG. 1.2). The information stored in the recovery catalog(s) may be arranged using any storage mechanism (e.g., a file system, a collection of tables or records, etc.). Further, the recovery catalog(s) may span logically across one or more physical storage devices, computing devices (see e.g., FIG. 5) and/or media (not shown), which may or may not be of the same type or co-located at a same physical site.

While FIG. 1.1 shows a configuration of components, other system configurations may be used without departing from the scope of the technology. In addition, while the components in FIG. 1.1 are shown as distinct components, one or more of these components may be co-located on the same physical hardware without departing from the technology.

Turning now to FIG. 1.2, FIG. 1.2 shows the databases (400) in accordance with one or more embodiments of the technology. The databases (400) may be arranged in a high-availability configuration. In such a configuration, each database is assigned a role (e.g., primary, physical standby, logical standby). The databases may be grouped into asset groups, where each asset group includes at least two databases. Further, each asset group includes one database with a role of primary and one or more databases with a role of standby (which may be a logical standby or a physical standby). The role associated with a given database may change over time. For example, if a database with the role of primary becomes unavailable (e.g., loses network connectivity), then another database in the asset group with a role of standby is selected and assigned the role of primary.

In one or more embodiments, a database with the role of primary (e.g., Database A, 402) is the main storage location of data for the asset group. Applications (not shown) executing on a host (e.g., FIG. 1.1, 200) may read data from and write data to this database. The databases (400) include functionality to replicate (or otherwise copy) the data from the database with the role of primary to databases with the role of standby (e.g., 404B, 404C, 404D 404E).

In one embodiment of the technology, databases with the role of physical standby (e.g., 404B, 404C) are identical copies of the database with the role of primary. The contents of the databases with the role of physical standby (e.g., 404B, 404C) may be initially created from a backup of the database with the role of primary (e.g., 402). Once created, the databases with the role of physical standby (e.g., 404B, 404C) may be maintained in sync with the contents of the database with the role of primary (e.g., 402), by obtaining redo logs from the database with the role of primary (e.g., 402) and then applying the redo logs to the databases with the role of physical standby (e.g., 404B, 404C). In one embodiment, a redo log stores, in a temporal order, the changes made to the database during a specific period of time.

In one embodiment of the technology, databases with the role of logical standby (e.g., 404D, 404E) include the same content as the database with the role of primary (e.g., 402); however, the structure and/or organization of the content may be different. The contents of the databases with the role of logical standby (e.g., 404D, 404E) may be initially created from a backup of database with the role of primary (e.g., 402). Once created, the databases with the role of logical standby (e.g., 404D, 404E) may be maintained in sync with the contents of the database with the role of primary (e.g., 402) by obtaining redo logs from the database with the role of primary (e.g., 402), converting the redo logs into SQL statements, and then executing the SQL statements on the contents of the databases with the role of logical standby (e.g., 404D, 404E). Unlike databases with the role of physical standby, databases with the role of logical standby may be used for both data protection and reporting.

In one or more embodiments, each of the databases (400) may include a local catalog (not shown) which stores information about the backups (or portions thereof) made of the data for each the database. Said another way, each time a backup of a database is made, the information related to the backup (including the location of the backup on the backup storage device) stored in the local catalog. In various implementations, this information, which is specific to backups for a given database, is provided to (or otherwise synchronized with) the recovery catalog(s) (see e.g., FIG. 1.1, 102). As a result, the recovery catalog(s) will ultimately include information about all backups performed on the databases. The information stored in the local catalogs may be arranged using any storage mechanism (e.g., a file system, a collection of tables or records, etc.).

While FIG. 1.2 shows a configuration of components, other database configurations may be used without departing from the scope of the technology.

Grouping of Assets into Asset Groups

Traditionally, each database in a system is identified and managed individually. Protecting assets individually as opposed to in groups can become a problem if there are hundreds of databases to manage on one system, and may result in wasting system resources. In the method described below, the databases groups are based on database type (e.g., replica database, container database). Once the databases are grouped, the data manager is able to protect the databases in the group (also referred to as an asset group) at the group level.

FIG. 2.1 shows a flowchart of a method for grouping databases of a compound asset in accordance with one or more embodiments of the technology. The method shown in FIG. 2.1 may be performed by, for example, the data manager (100). Other components of the system in FIGS. 1.1-1.2 may perform all, or a portion, of the method of FIG. 2.1 without departing from the scope of the invention.

All, or a portion, of the method shown may be performed by one or more components of the system. While the various steps in this flowchart are presented and described sequentially, one of ordinary skill in the relevant art will appreciate that some or all of the steps may be executed in different orders, combined, or omitted, and some or all of the steps may be executed in parallel.

Turning to FIG. 2.1, in Step 200, the Natural ID for an asset (e.g., a database) is obtained by the data manager. The Natural ID identifies the individual asset at the time at which it is obtained, and may change over time. Each asset in a system has its own Natural ID. The asset may be discovered by an agent on the host, where the host is operatively connected to the database. The agent may then propagate the Natural ID of the asset to data manager (via the agent service executing on the host). In another embodiment, the agent may obtain information about the database during the recovery process. The agent may then use this information to derive the Natural ID.

In Step 202, the type of the asset is determined by the data manager. As part of the discovery process, the agent may also obtain information about the type of asset. The type of the asset may be a replica asset, a container asset, or any other type of asset. A replica asset refers to an asset that is part of high-availability configuration (see e.g., FIG. 1.2), where there is one primary asset and one or more copies (replicas of the primary asset). A container asset refers to an asset that is executing in a container. The agent may propagate the type of the asset to data manager (via the agent service executing on the host). Alternatively, the agent may obtain information about the asset during the discovery process and then propagate this information to the data manager. The data manager may then determine (or otherwise derive) the type of the asset from this information.

In Step 204, a determination is made about whether an asset group already exists for the type of the asset determined in Step 202. If an asset group already exists for this asset type, the method proceeds to Step 206; if an asset group does not already exist for this asset type, the method proceeds to Step 208.

The determination in Step 202 may be performed by querying the data manager records (described above) to determine whether there is a record of an asset group for the specific asset type. Further, even if there is a record of the asset group for a specific asset type, the data manager may manage different/multiple asset groups of the same asset type. In such cases, Step 202 may include displaying the current asset groups to the user via a graphical user interface (GUI) and obtaining input from the user (via the GUI) to which asset group the asset should be assigned, or if a new asset group should be created and the asset assigned to the new asset group.

In Step 206, a new asset group is created, which includes creating a new asset group ID. Step 206 may include creating a new record in the data manager records for the asset group and storing a Group ID in this record.

In Step 208, the asset is associated with the asset group by the data manager. Once associated with the asset group, the asset will be backed up according to the protection strategy associated with the asset group. Step 208 may include storing the Natural ID of the asset (and any other information) in a record associated with the asset group (i.e., the asset group that was identified in step 204 or the asset group that was created in step 206) in the data manager. Other data structures for recording the association between the assets discovered in Step 200 and the asset group may be used without departing from the technology.

Once an asset is associated with an asset group, the asset group identifier may be propagated back to the agent (via the agent service). The agent may then store the asset group identifier in the corresponding database.

Following Step 208, once a given asset is associated with an asset group, a user of the data manager may view all assets associated with an asset group via a graphical user interface (GUI). The GUI may show the following information: (i) the listing of asset groups (including their asset group identifiers); and (ii) for each asset group, the assets associated with the asset group, the natural ID of the asset, the type of asset, and whether the asset is currently protected (i.e., there is a backup for the asset).

In one embodiment, because the assets are protected at a group-level, an asset of a replica type may be deemed to be protected, if there is at least one backup for at least one asset in the asset group. Further, in the event of a restore, a user will be able to use the GUI to determine the backup copies associated with the asset group and then select one of these copies to use to restore one or more assets in the asset group.

Referring now to FIG. 2.2, FIG. 2.2 shows a method for associating a backup strategy with the asset group. This method is performed by the data manager (FIG. 1.1, 100). The method in FIG. 2.2 may be performed at any point (and also repeated) after the asset group is created in FIG. 2.1.

Turning to FIG. 2.2, in Step 210, an asset group is selected from a set of asset groups managed by the data manager.

In Step 212, the backup strategy for the type of asset on the asset group is obtained by the data manager. The backup strategy may be specified on an asset group basis, on an asset group and an application basis, on another basis, or any combination thereof.

If the asset group is for type: replica database, then the backup strategy (also referred to as a backup protection strategy) may use heuristics to identify available databases in the asset group and then select an available database to backup based on, e.g., load levels of the available database, in order to minimize the performance impact on applications uses the database.

If the asset group is for type: container database, then the backup strategy may identify the individual databases within the asset group (i.e., the individual databases within a given container), and then set up a backup strategy per database within the container (which, in this example, defines the asset group, i.e., all databases within the container that are part of an asset group).

The backup strategy, regardless of asset type, may also specify the backup frequency and the type of backups to be obtained (e.g., full backup or partial backups).

In Step 214, the backup strategy is associated with the asset group. For all backup operations on the selected asset group, the associated backup strategy will be used.

In Step 216, the backup protection strategy for the asset group is initiated. More specifically, at the appropriate frequency (as specified in the data protection strategy), the data manager issues backup requests to the appropriate agent service (i.e., to the agent service on the host that is executing the agent that will ultimately service the backup request). The agent service subsequently sends the backup request to the appropriate agent. The agent subsequently initiates the backup on the appropriate asset (e.g., database). After the backup is successfully completed, the information about the successful backup is propagated to the data manager (via the agent service). The initiation of the backup process may include the agent instructing the asset to start a backup operation to copy the data from the asset to the backup storage system.

Grouping of Assets in a High-Availability Configuration into Asset Groups

FIGS. 3.1-3.3 show flowcharts of a method for grouping databases on the system configuration in accordance with one or more embodiments of the technology. The method shown in FIGS. 3.1-3.3 may be performed by, for example, the data manager (100). Other components of the system in FIGS. 1.1-1.2 may perform all, or a portion, of the method of FIGS. 3.1-3.3 without departing from the scope of the invention.

All or a portion of the method shown may be performed by one or more components of the system. While the various steps in this flowchart are presented and described sequentially, one of ordinary skill in the relevant art will appreciate that some or all of the steps may be executed in different orders, combined, or omitted, and some or all steps may be executed in parallel.

Turning to FIG. 3.1, in Step 300, the Group ID, Natural ID (defined above), and other attributes (e.g., the role of asset, the asset type) of an asset are obtained by the data manager. The Group ID identifies the group to which the asset belongs. The Group ID may be specified by the user of the asset when the asset is initially configured. For example, when the asset is configured as part of a high-availability configuration (see e.g., FIG. 1.2), the user may specify a Group ID for the asset (e.g., HA-G1)

The asset may be discovered by an agent on the host, where the host is operatively connected to the database. The agent may then propagate the Group ID, Natural ID and other attributes (or information) of the asset to data manager (via the agent service executing on the host).

In Step 302, a determination is made about whether an asset group already exists for the asset obtained in Step 300. If an asset group already exists for this asset type, the method proceeds to Step 304; if an asset group does not already exist for this asset type, the method proceeds to Step 306.

The determination in Step 302 may be performed by querying the data manager records (described above) to determine whether there is a record of an asset group with the Group ID. If there is a record of an asset group with the Group ID, then the process proceeds to Step 306; otherwise, the process proceeds to Step 304.

In Step 306, a record for the new asset group is created in the data manager records and the Group ID is stored in this record.

In Step 308, the asset is associated with the asset group by the data manager. Once associated with the asset group, the asset will be backed up according to the protection strategy associated with the asset group. Step 308 may include storing Natural ID of the asset (and any other information) in a record associated with the asset group (i.e., the asset group that was identified in Step 304 or the asset group that was created in Step 306) in the data manager. Other data structures for recording the association between the asset discovered in Step 300 and the asset group may be used without departing from the technology.

Following Step 308, once a given asset is associated with an asset group, a user of the data manager may view all assets associated with an asset group via a graphical user interface (GUI). The GUI may show the following information: (i) the listing of asset groups (including their asset group identifiers); and (ii) for each asset group, the assets associated with the asset group, the natural ID of the asset, the type of asset, and whether the asset is currently protected (i.e., there is a backup for the asset).

Referring now to FIG. 3.2, FIG. 3.2 shows a method for associating a backup strategy with the asset group. This method is performed by the data manager (FIG. 1.1, 100). The method in FIG. 3.2 may be performed at any point (and also repeated) after the asset group is created in FIG. 3.1.

Turning to FIG. 3.2, in Step 310, an asset group is selected from set of asset groups managed by the data manager.

In Step 312, the backup strategy for the asset group is obtained by the data manager.

In one embodiment, the backup strategy specifies that an asset with the role of primary (see e.g., FIG. 1.2, 402) in a high-availability configuration is to be backed up. In this embodiment, the role and not a specific database is specified in the backup strategy. In another embodiment, the backup strategy specifies that an asset with the role of standby (see e.g., FIG. 1.2, 404B) in a high-availability configuration is to be backed up. In this embodiment, the role and not a specific database is specified in the backup strategy. This approach enables protection strategies to be based on roles, which inherently accounts for the dynamic nature of the role associations in high-availability configurations. In another embodiment, the assets may be volumes and the backup strategy specifies that all volumes in the asset group are to be backed up.

In one embodiment, the backup strategy may also specify the backup frequency and the type of backups to be obtained (e.g., full backup or partial backups).

In Step 314, the backup strategy is associated with the asset group. For all backup operations on the selected asset group, the associated backup strategy will be used.

In Step 316, the backup protection strategy for the asset group is initiated. Initiating on the backup strategy results in the data manager starting to following the backup strategy associated with the asset group, e.g., by scheduling backups for the asset group based on the frequency specified in the backup strategy.

Referring now to FIG. 3.3, FIG. 3.3 shows a method for initiating a backup based on the strategy previously associated with the asset group. This method is performed by the data manager (FIG. 1.1, 100). The method in FIG. 3.3 may be performed at any point (and also repeated) after Step 316 in FIG. 3.2.

Turning to FIG. 3.2, in Step 320, a backup is initiated for the asset group. More specifically, at the appropriate frequency (as specified in the data protection strategy), the data manager receives a backup request for an asset group.

In Step 322, the backup strategy for the asset group is obtained by the data manager, where the backup strategy specifies a role. The data manager may obtain the backup strategy from the data manager records.

In Step 324, the asset in the asset group associated with the role is identified by the data manager, e.g., by querying the data manager records. The role of a database required by the backup protection strategy may be primary or standby.

In Step 326, a backup is initiated for the identified asset. More specifically, the data manager issues backup requests to the appropriate agent service (i.e., to the agent service on the host that is executing the agent that will ultimately service the backup request). The agent service subsequently sends the backup request to the appropriate agent. The agent subsequently initiates the backup on the appropriate asset (i.e., the database identified in step 324). After the backup is successfully completed, the information about the successful backup is propagated to the data manager (via the agent service). The initiation of the backup process may include the agent instructing the asset to start a backup operation to copy the data from the asset to the backup storage system.

Managing the Archive Logs for an Asset Group

During the operation of a database, log files are created. Traditionally, the logs of a database are only deleted when a database is backed up. For example, if the database configuration follows the protection strategy of only performing backups on the primary database (e.g., FIG. 1.2, 402), the logs (e.g., redo logs) on the primary database will be deleted, but will continue to accumulate on the standby databases. In the above example, if the logs are not deleted from the standby databases, then they will continue to take up space on the standby databases. As a result, the functionality of these databases is impacted and, in the event that the primary database fails, none of these standby databases may be able to successfully become a primary database. In the method described below, if the assets are protected as part of an asset group, the logs for the databases in the asset group that are not being backed up may be deleted thereby addressing at least the above issues.

FIG. 4.1 shows a flowchart of a method for managing database logs in accordance with one or more embodiments of the technology. The method shown in FIG. 4.1 may be performed by, for example, the data manager (FIG. 1.1, 100). Other components of the system in FIGS. 1.1-1.2 may perform all, or a portion, of the method of FIG. 4.1 without departing from the scope of the invention.

All or a portion of the method shown may be performed by one or more components of the system. While the various steps in this flowchart are presented and described sequentially, one of ordinary skill in the relevant art will appreciate that some or all of the steps may be executed in different orders, combined, or omitted, and some or all steps may be executed in parallel.

The method in FIG. 4.1 may be performed periodically (e.g., every 24 hours) to delete logs for databases in an asset group. More specifically, this method may be performed once an asset group has been formed, and backups are being generated for databases in the asset group (see e.g., FIGS. 2.1-3.3). Once a backup for a given database has been completed, the data manager (or another component in the system) may initiate and/or perform a synchronization (or sync operation) between the local catalog (i.e., the local catalog on the database that was backed up) and the recovery catalog, such that the recovery catalog has all of the information from the local catalog. Once this synchronization is completed, the method in FIG. 4.1 may be performed.

Once the recovery catalog has been synchronized (as discussed above), the recovery catalog has all of the information necessary to recovery any of the assets in the asset group. As such, the logs on these other assets are now redundant, as they are duplicative of the contents in the recovery catalog. Accordingly, it is not necessary to continue to store these logs. The ability to delete the logs is enabled by the data manager's ability to identify that the assets belong to an asset group, that one asset in the asset group has been backed up, and that the recovery catalog has been synchronized.

Turning to FIG. 4.1, in Step 400, an asset group is identified. The data manager may identify the asset group using data manager records.

In Step 402, a log cleanup operation is triggered for assets in the asset group. More specifically, the following method is triggered: (i) all assets in the asset group are identified using the data manager records, (ii) the asset in the asset group that was most recently backed up is identified from the set of assets determined in (i), and (iii) the logs from all other assets identified in (i) are deleted.

The triggering in Step 402 may include the data manager issuing a request (e.g., a deletion request) (which specifies the databases on which to delete the logs) to the appropriate agent service (i.e., to the agent service on the host that is executing the agent that will ultimately service the deletion request). The agent service subsequently sends the deletion request to the appropriate agent. The agent subsequently initiates the deletion on the appropriate assets in the asset group (i.e., on the aforementioned identified databases). After the deletion is successfully completed, the information about the successful deletion is propagated to the data manager (via the agent service). The initiation of the deletion process may include the agent instructing each of the identified assets to start a deletion operation to delete their logs.

Example

The following describes a non-limiting example of the method shown in FIG. 4.1. Consider a scenario in which an asset group (426) includes three databases (database A (420), database B (422), database C (424)). Further, the asset group is backed up using a backup strategy, which backs up the primary database (i.e., database A, 420).

Referring to FIG. 4.2, prior to database A being backed up, all three databases are accumulating logs (e.g., 431, 432, 433, 434, 435, 436). Referring to FIG. 4.3, at a later point in time, database A is backed up and the contents of database A's local catalog (not shown) are synchronized with the recovery catalog (440). This synchronization results in information related to the backup of database A being stored in the recovery catalog (i.e., database A entries (442)). In addition, as part of the backup of database A, the logs on database A are deleted (i.e., 431, 432). However, because database B and database C were not backed up, their logs remain (i.e., 433, 434, 435, 436).

After the aforementioned backup of database A, and in accordance with method shown in FIG. 4.1, the data manager (not shown) determines that database A, database B, and database C are part of the asset group (426), and that the database A was the most recently backed up database. In response to these determinations, the logs (i.e., 433, 434, 435, 436) in databases B and C are deleted. This results in the state of the databases shown in FIG. 4.3.

End of Example

As discussed above, embodiments described herein may be implemented using computing devices. FIG. 5 shows a diagram of a computing device in accordance with one or more embodiments disclosed. The computing device (500) may include one or more processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one or more embodiments, the processor(s) (502) may be an integrated circuit for processing instructions. For example, the processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one or more embodiments, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the processor(s) (502), non-persistent storage (504), and persistent storage (506). Many diverse types of computing devices exist, and the aforementioned input and output device(s) may take other forms.

The problems discussed above should be understood as being examples of problems solved by embodiments described herein, and the scope of the embodiments should not be limited to solving the same/similar problems. The disclosed technology is broadly applicable to address a range of problems beyond those discussed herein.

One or more embodiments of the technology may be implemented using instructions executed by one or more processors of a computing device. Further, such instructions may correspond to computer readable instructions that are stored on one or more non-transitory computer readable mediums.

In the above description, numerous details are set forth as examples of embodiments described herein. It will be understood by those skilled in the art, and having the benefit of this Detailed Description, that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for backing up assets and managing asset logs, the method comprising:

obtaining a natural identifier (ID) for an asset;

identifying an asset type of the asset, wherein the asset type comprises a replica asset or a container asset:

making a first determination that an asset group does not exist for the asset type;

creating, in response to the first determination, the asset group and associating the asset with the asset group;

obtaining, after the creating, a group ID associated with the asset, wherein the group ID is discovered by an agent executing on a host that is operatively connected to the asset;

associating the asset with an asset group using the group ID, wherein all assets in the asset group are associated with the group ID, wherein the group ID is stored in association with the natural ID of the asset in a record;

protecting the asset in the asset group using a role-based backup strategy associated with the asset group;

performing, based on the role-based backup strategy, a backup of the asset in the asset group, wherein the backup identifies the asset using the natural ID recorded in association with the group ID;

performing, after the backup of the asset, a synchronization between a local catalog on the asset and a recovery catalog; and deleting a log from a second asset in the asset group, wherein the asset has a role of primary and the second asset has a role of standby, and wherein the deleting comprises:

making a first determination that the backup of the asset in the asset group has been completed;

making a second determination that the recovery catalog has been synchronized with the local catalog; and based on the first determination and the second determination, deleting the log from the second asset.

2. The method of claim 1, wherein the asset is a database.

3. The method of claim 1, wherein the asset is a database in a high-availability configuration and all assets in the high-availability configuration are associated with the asset group.

4. The method of claim 1, wherein associating the asset with the asset group comprises:

making a second determination that a record comprising the group ID has been previously created in a data manager; and associating, based on the second determination, a natural ID of the asset with the record of the asset group.

5. The method of claim 1, wherein associating the asset with the asset group comprises:

making a second determination that a record comprising the group ID has not been previously created in a data manager;

in response to the second determination, creating the record comprising the group ID and associating a natural ID of the asset with the record of the asset group.

6. A non-transitory computer readable medium comprising computer readable program code, which when executed by a computer processor enables the computer processor to perform a method for backing up assets, the method comprising:

obtaining a natural identifier (ID) for an asset;

identifying an asset type of the asset, wherein the asset type comprises a replica asset or a container asset;

making a first determination that an asset group does not exist for the asset type;

creating, in response to the first determination, the asset group and associating the asset with the asset group;

obtaining, after the creating, a group ID associated with the asset, wherein the group ID is discovered by an agent executing on a host that is operatively connected to the asset;

associating the asset with an asset group using the group ID, wherein all assets in the asset group are associated with the group ID, wherein the group ID is stored in association with the natural ID of the asset in a record;

protecting the asset in the asset group using a role-based backup strategy associated with the asset group;

performing, based on the role-based backup strategy, a backup of the asset in the asset group, wherein the backup identifies the asset using the natural ID recorded in association with the group ID;

performing, after the backup of the asset, a synchronization between a local catalog on the asset and a recovery catalog; and deleting a log from a second asset in the asset group, wherein the asset has a role of primary and the second asset has a role of standby, and wherein the deleting comprises:

making a first determination that the backup of the asset in the asset group has been completed;

making a second determination that the recovery catalog has been synchronized with the local catalog; and based on the first determination and the second determination, deleting the log from the second asset.

7. The non-transitory computer readable medium of claim 6, wherein the asset is a database.

8. The non-transitory computer readable medium of claim 6, wherein the asset is a database in a high-availability configuration and all assets in the high-availability configuration are associated with the asset group.

9. The non-transitory computer readable medium of claim 6, wherein associating the asset with the asset group comprises:

making a second determination that a record comprising the group ID has been previously created in a data manager; and associating, based on the second determination, a natural ID of the asset with the record of the asset group.

10. The non-transitory computer readable medium of claim 6, wherein associating the asset with the asset group comprises:

making a second determination that a record comprising the group ID has not been previously created in a data manager;

in response to the second determination, creating the record comprising the group ID and associating a natural ID of the asset with the record of the asset group.

11. A system, comprising:

a plurality of databases;

a data manager configured to:

obtaining a natural identifier (ID) for an asset;

identifying an asset type of the asset, wherein the asset type comprises a replica asset or a container asset;

making a first determination that an asset group does not exist for the asset type;

creating, in response to the first determination, the asset group and associating the asset with the asset group;

obtaining, after the creating, a group identifier (ID associated with a database of the plurality of databases, wherein the group ID is discovered by an agent executing on a host that is operatively connected to the database;

associating the database with an asset group using the group ID wherein all assets in the asset group are associated with the group ID, wherein the group ID is stored in association with the natural ID of the asset in a record;

protecting the database in the asset group using a role-based backup strategy associated with the asset group;

performing, based on the role-based backup strategy, a backup of the database in the asset group, wherein the backup identifies the asset using the natural ID recorded in association with the group ID;

performing, after the backup of the database, a synchronization between a local catalog on the database and a recovery catalog; and deleting a log from a second database in the asset group, wherein the database has a role of primary and the second database has a role of standby, and wherein the deleting comprises:

making a first determination that the backup of the database in the asset group has been completed;

making a second determination that the recovery catalog has been synchronized with the local catalog; and based on the first determination and the second determination, deleting the log from the second database.

12. The system of claim 11, wherein the database is in a high-availability configuration and all assets in the high-availability configuration are associated with the asset group.

13. The system of claim 11, wherein associating the database with the asset group comprises:

making a second determination that a record comprising the group ID has been previously created in a data manager; and associating, based on the second determination, a natural ID of the database with the record of the asset group.

14. The system of claim 11, wherein associating the database with the asset group comprises:

making a second determination that a record comprising the group ID has not been previously created in a data manager;

in response to the second determination, creating the record comprising the group ID and associating a natural ID of the database with the record of the asset group.

\* \* \* \* \*